US010528295B2

United States Patent
Barajas Gonzalez et al.

(10) Patent No.: US 10,528,295 B2
(45) Date of Patent: Jan. 7, 2020

(54) INTRA-TIER DATA MIGRATION TO SEGREGATE ZOMBIE STORAGE FROM DEAD STORAGE

(71) Applicant: International Business Machines Corporation, Armonk, NY (US)

(72) Inventors: Emmanuel Barajas Gonzalez, Guadalajara (MX); Shaun E. Harrington, Sahuarita, AZ (US); Harry R. McGregor, Tucson, AZ (US); Christopher B. Moore, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 15/582,654

(22) Filed: Apr. 29, 2017

(65) Prior Publication Data
US 2018/0314456 A1    Nov. 1, 2018

(51) Int. Cl.
G06F 12/02    (2006.01)
G06F 3/06    (2006.01)

(52) U.S. Cl.
CPC ............ G06F 3/067 (2013.01); G06F 3/0611 (2013.01)

(58) Field of Classification Search
CPC combination set(s) only.
See application file for complete search history.

(56) References Cited

U.S. PATENT DOCUMENTS

| 8,024,542 B1 | 9/2011 | Chatterjee et al. | |
| 2010/0306464 A1* | 12/2010 | Dawkins | G06F 3/0605 711/114 |
| 2014/0082261 A1* | 3/2014 | Cohen | G11C 16/06 711/103 |
| 2014/0188870 A1* | 7/2014 | Borthakur | G06F 16/23 707/736 |
| 2015/0067258 A1 | 3/2015 | Jung et al. | |
| 2017/0060980 A1* | 3/2017 | Harris, Jr. | G06F 17/30221 |

OTHER PUBLICATIONS

Anonymously; "Applying Retail Chain Analytics and Forecasting on Storage Systems"; IP.com No. IPCOM000243098D; http://ip.com/IPCOM/000243098D; Sep. 15, 2015.
Anonymously; "Method and System for Distributing Cloud Resources based on Predictive Access Demand"; IP.com No. IPCOM000218156D; http://ip.com/IPCOM/000218156D; May 24, 2012.
Graham, D. et al.; "The Data Temperature Spectrum"; Teradata Corporation, The Best Decision Possible, http://teradata.com/.../The_Data_Temperature_Spectrum/pdf.; Jun. 2012.

* cited by examiner

*Primary Examiner* — Yong J Choe
(74) *Attorney, Agent, or Firm* — Nelson and Nelson; Daniel P. Nelson; Alexis V. Nelson

(57) ABSTRACT

A method for segregating zombie storage from dead storage is disclosed. In one embodiment, such a method includes tracking I/O to a storage tier intended to store inactive data. The method analyzes the I/O to identify slightly active data in the storage tier. The method further logically divides the storage tier into a zombie storage pool, intended to store slightly active data, and a dead storage pool, intended to store inactive data. The method segregates, within the storage tier, the slightly active data from the inactive data. This segregation process includes storing the slightly active data in the zombie storage pool and storing the inactive data in the dead storage pool. A corresponding system and computer program product are also disclosed.

20 Claims, 6 Drawing Sheets

INTRA-TIER DATA MIGRATION TO SEGREGATE ZOMBIE STORAGE FROM DEAD STORAGE

FIELD OF THE INVENTION

This invention relates to systems and methods for storing data, and more particularly to systems and methods for reducing power consumed by data storage devices.

BACKGROUND OF THE INVENTION

The emergence of the Internet and the growth of business enterprises have resulted in a dramatic increase in server-centric applications. This increase has caused an equally dramatic rise in data-centric services, such as transaction processing systems, web portals, email servers, stock trading and financial transaction systems, search engines, file servers, cloud storage services, and the like. No longer just the domain of larger corporations, such data-centric services are becoming more prevalent with smaller business enterprises and institutions. These data-centric services are increasingly important in the global economy as millions (and perhaps even billions) of users rely on these services each day.

One thing that each of the above data-centric services has in common is that each typically relies heavily on storage systems for their data storage and processing requirements. Often, these storage systems are implemented as arrays of solid state drives, disk drives, tape libraries, or other storage devices. These storage systems may, in turn, be connected to networks to form storage-area-networks or network-attached storage. As data-centric services increase, reliance on storage systems of various types also increases.

Unfortunately, as reliance on storage systems continues to increase, the power consumed by the storage systems also increases. The increased power consumption can significantly increase running costs, stresses on power supplies, impacts on the environment, and device failure rates. These power costs are eventually passed on to consumers.

In today's datacenters, having a power efficient storage infrastructure becomes critical, especially when a datacenter or portions of it experience data-explosion and the amount of data that needs to be stored grows beyond the tens of petabytes threshold. The number of storage devices such as disk drives needed to provide such storage space will experience similar growth. In such situations, it is important to be able to use these storage devices as efficiently as possible and configure them to consume as little power as possible.

In view of the foregoing, what are needed are systems and methods to reduce the power consumed by storage systems. Such systems and methods will ideally be able to power down certain storage devices in a storage system to conserve power.

SUMMARY

The invention has been developed in response to the present state of the art and, in particular, in response to the problems and needs in the art that have not yet been fully solved by currently available systems and methods. Accordingly, systems and methods are disclosed to segregate zombie storage from dead storage. The features and advantages of the invention will become more fully apparent from the following description and appended claims, or may be learned by practice of the invention as set forth hereinafter.

Consistent with the foregoing, a method for segregating zombie storage from dead storage is disclosed. In one embodiment, such a method includes tracking I/O to a storage tier intended to store inactive data. The method analyzes the I/O to identify slightly active data in the storage tier. The method further logically divides the storage tier into a zombie storage pool, intended to store slightly active data, and a dead storage pool, intended to store inactive data. The dead storage pool is made up of storage drives that are normally powered down and the zombie storage pool is made up of storage drives that are powered up more frequently than storage drives of the dead storage pool. The method segregates, within the storage tier, the slightly active data from the inactive data. This segregation process includes storing the slightly active data in the zombie storage pool and storing the inactive data in the dead storage pool.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
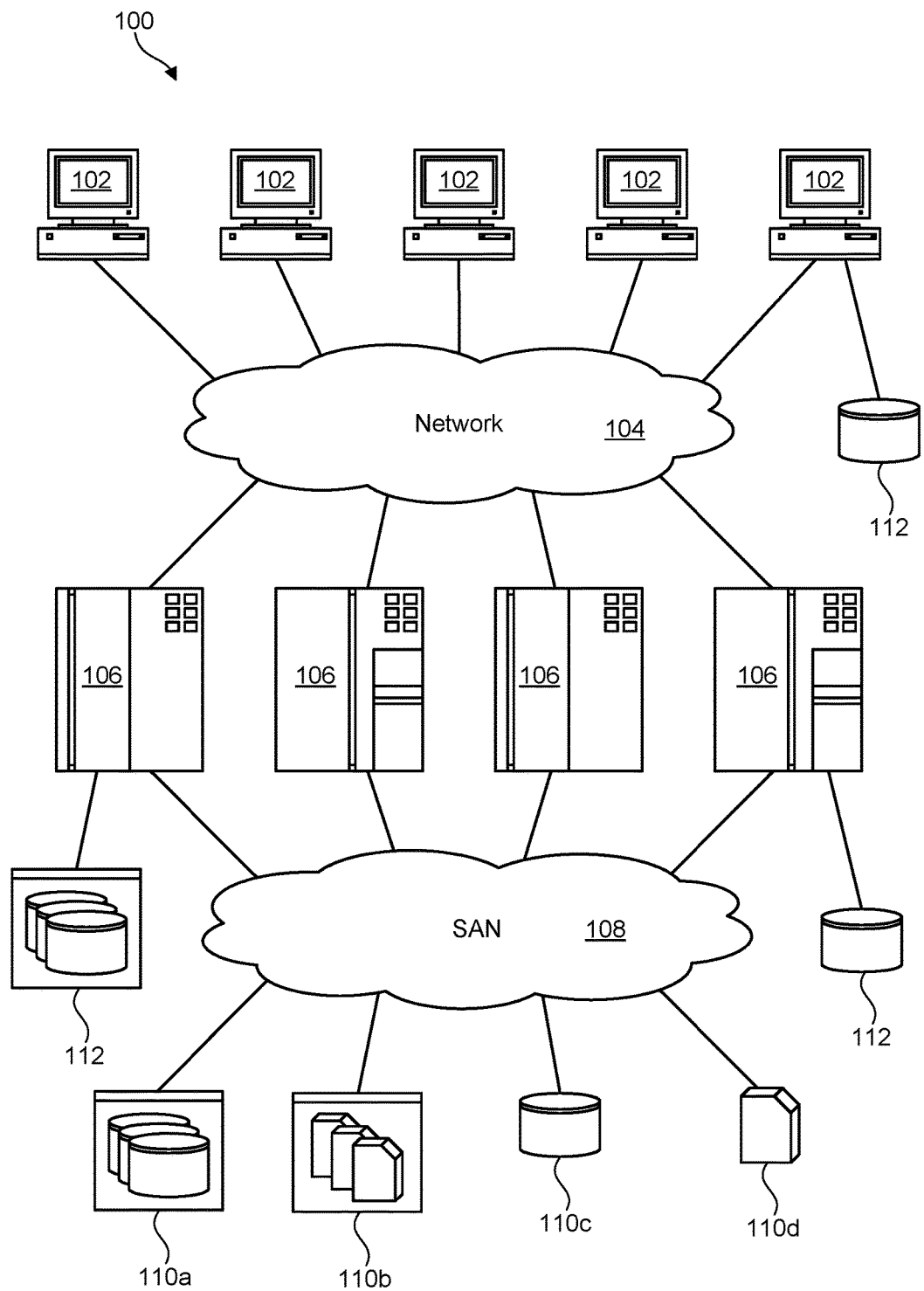
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
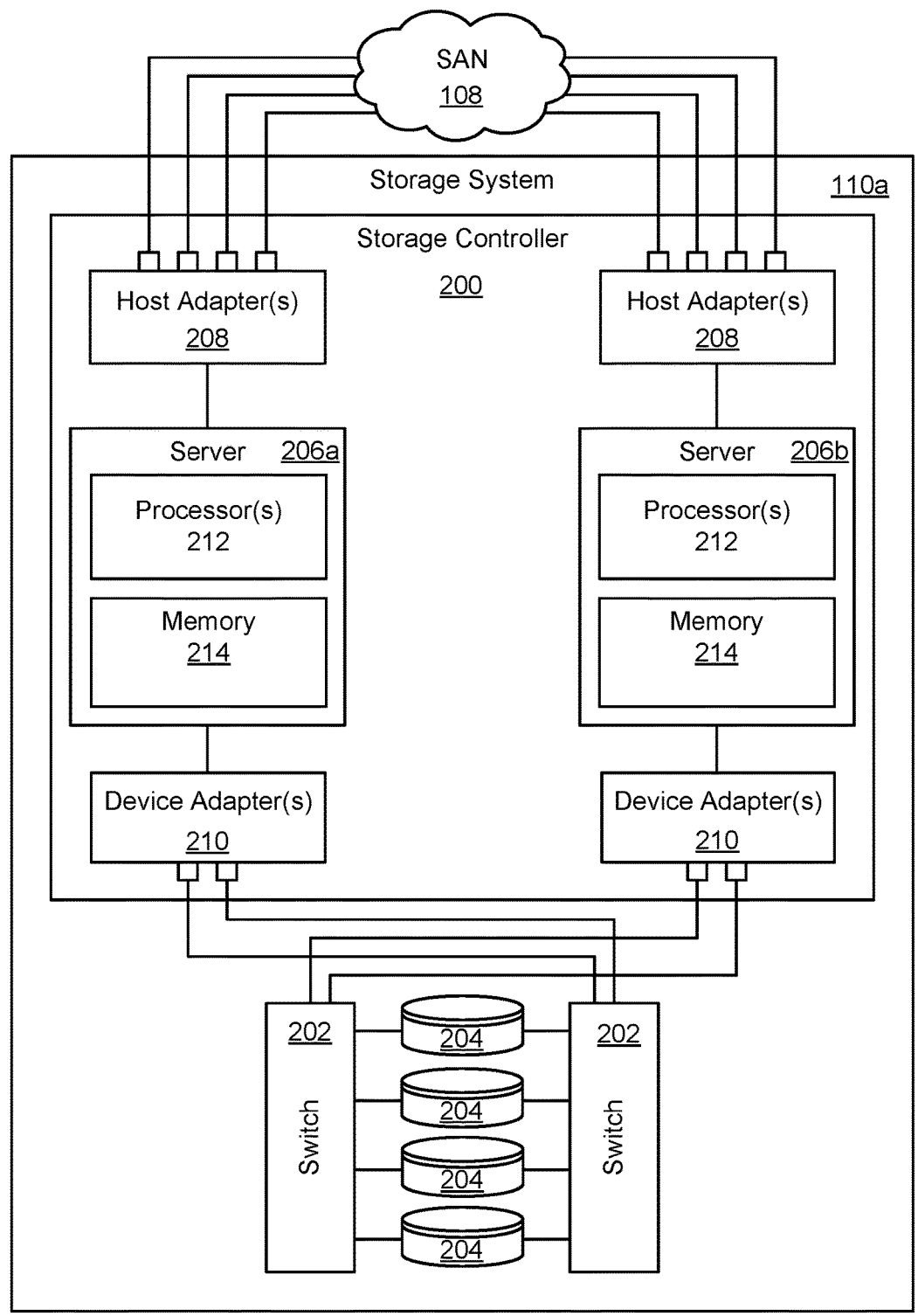
FIG. 2 is a high-level block diagram showing an example of a storage system containing an array of storage drives.

Referring to FIG. 2, one embodiment of a storage system 110a containing an array of hard-disk drives 204 and/or solid-state drives 204 is illustrated. The internal components of the storage system 110a are shown since certain functionality in accordance with the invention may be implemented within such a storage system 110a. As shown, the storage system 110a includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
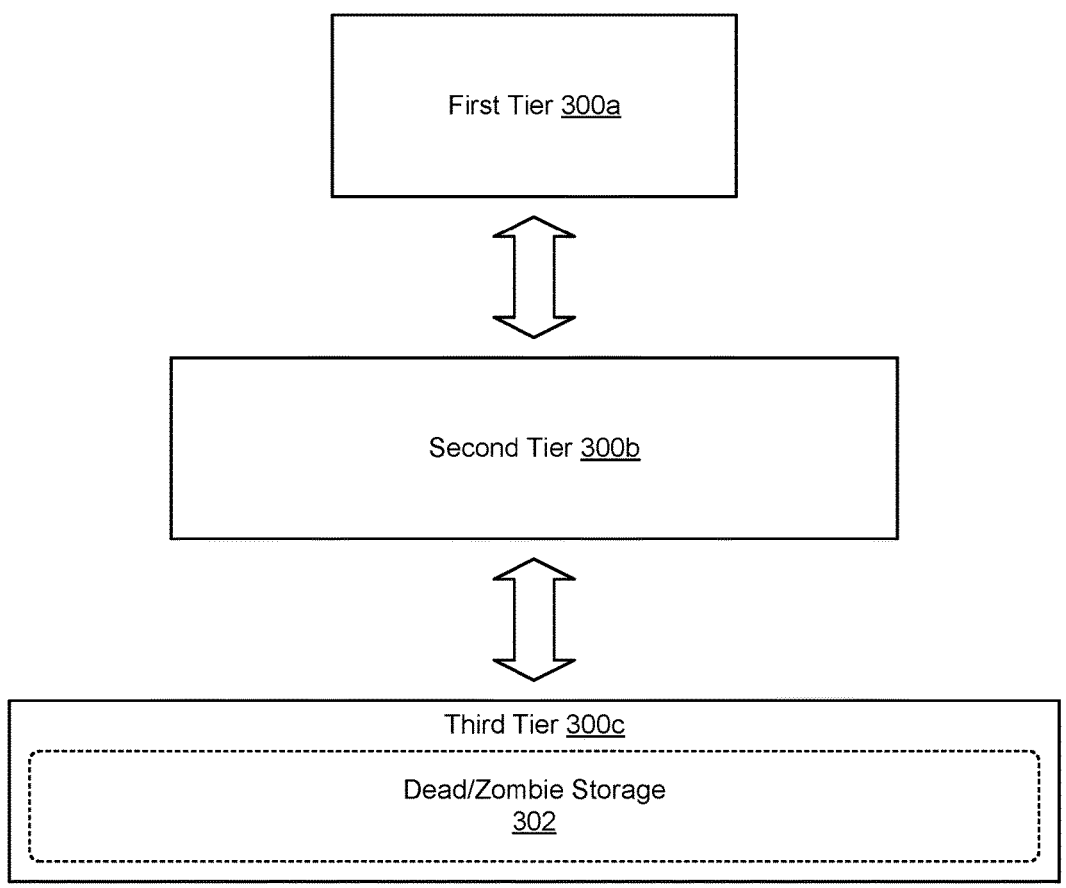
FIG. 3 shows a tiered storage environment having a storage tier dedicated to dead or zombie storage.

Referring to FIG. 3, in certain embodiments, one or more storage systems 110 may be configured to provide tiered data storage. In such an environment, the "hotness" or "coldness" of data may be continually monitored so that it can be optimally placed on different storage tiers 300. For example, faster storage drives 204 (e.g., solid state drives) may make up a first storage tier 300a, intermediate performance storage drives 204 (e.g., higher performance hard-disk drives) may make up a second storage tier 300b, while slower storage devices (e.g., lower performance hard-disk drives) may make up a third storage tier 300c. "Hot" (i.e., frequently accessed) data may be placed on the first storage tier 300a to improve I/O performance, while "warm" (i.e., less frequently accessed) data may be placed on the second storage tier 300b. "Cold" (i.e., even less frequently accessed) data may be placed on the third storage tier 300c. As the temperature of the data changes, the data may be migrated between the storage tiers 300a-c to optimize I/O performance. The storage tiers 300a-c may be implemented within a single storage system 110 or potentially distributed across multiple storage systems 110. Similarly, additional (or fewer) tiers 300 may be provided where needed. The example described above is provided only by way of example and not limitation.

In certain cases, a lower storage tier 300, such as the third tier 300c illustrated in FIG. 3, may be designated to store very cold data (also referred to herein as "dead" data) that is no longer accessed or only very infrequently accessed. In certain embodiments, this may enable storage drives 204 that make up the third storage tier 300c to be powered down much of the time to save power. A storage tier 300 that contains storage drives 204 that are normally powered down may be referred to herein as "dead" storage. Although effective to save power, certain data within the "dead" storage may receive intermittent read and/or write requests that may require the storage drives 204 to be powered up. This may undermine the purpose of the "dead" storage which is to reduce power usage. For the purpose of this description, data that is cold but nevertheless receives some intermittent read and/or write requests is referred to as "zombie" data to reflect that it is not quite "dead." This data may not receive enough reads or writes to warrant moving it to a higher storage tier 300a, 300b. Similarly, storage that is used to store "zombie" data may be referred to "zombie" storage since it is not quite dead and may need to be powered up and down from time to time. In certain cases, small amounts of "zombie" data in what is otherwise "dead" data may cause storage drives 204 to be powered up and down, thereby defeating the purpose of powering down the storage drives 204 in the first place. FIG. 3 shows a third storage tier 300c that is used as dead/zombie storage 302 to store some "zombie" data intermingled with "dead" data.

Figure 4:
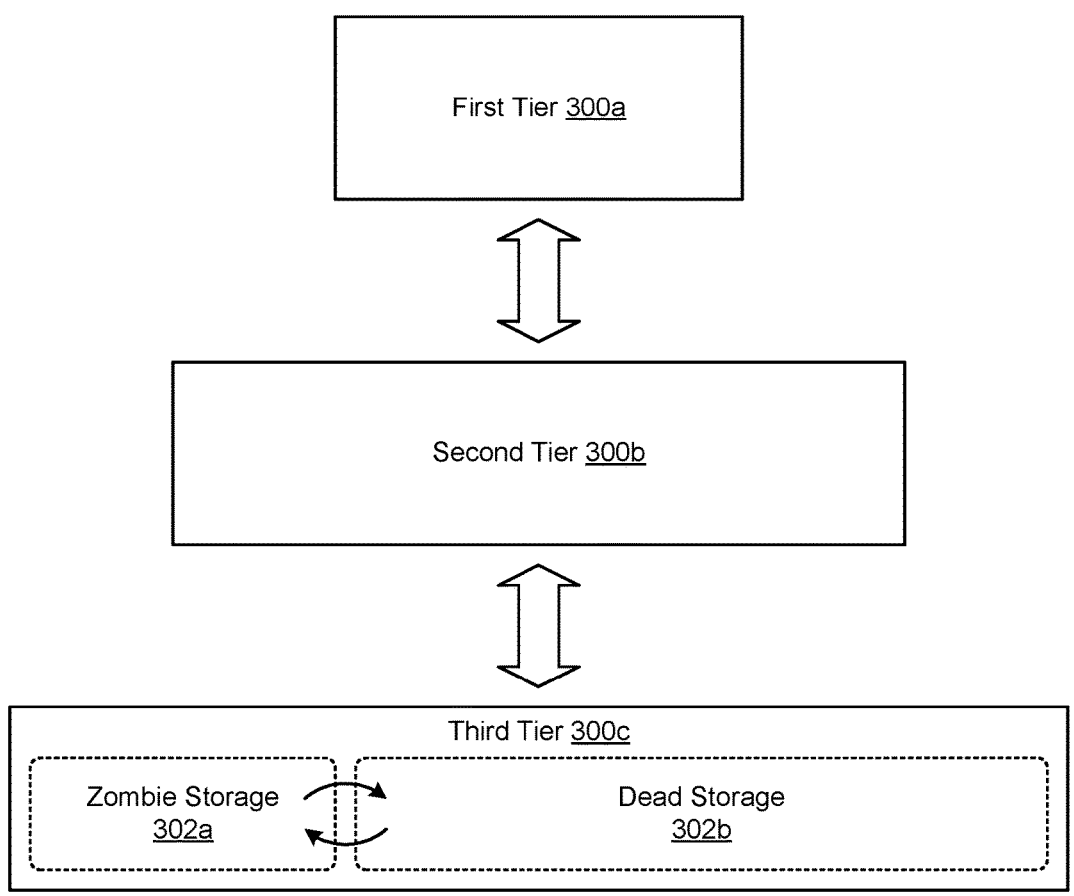
FIG. 4 shows segregation of zombie storage from dead storage within a storage tier.

Referring to FIG. 4, in order to improve the efficiency and power savings of the dead/zombie storage 302, a storage tier 300 providing the dead/zombie storage 302 may be divided up into multiple storage pools, namely a zombie storage pool 302a and a dead storage pool 302b. The zombie storage pool 302a may be used to store "zombie" data that receives some intermittent reads and/or writes. The dead storage pool 302b may be used to store "dead" data that receives no reads and/or writes or very minimal reads and/or writes. This may enable storage drives 204 that make up the dead storage pool 302b to be powered down more often, thereby saving power. Storage drives 204 making up the zombie storage pool 302a, by contrast, may be powered up more often to process incoming intermittent reads and/or writes. In certain embodiments, the dead storage pool 302b and zombie storage pool 302a contain storage drives 204 that are the same or have substantially the same performance characteristics. Data may be moved between the zombie storage pool 302a and the dead storage pool 302b as the read/write frequency of the data changes. In essence, this is an intra-tier data migration technique that improves the overall power efficiency of the storage tier 300 by separating "zombie" data and "dead" data into different storage pools 302.

Figure 5:
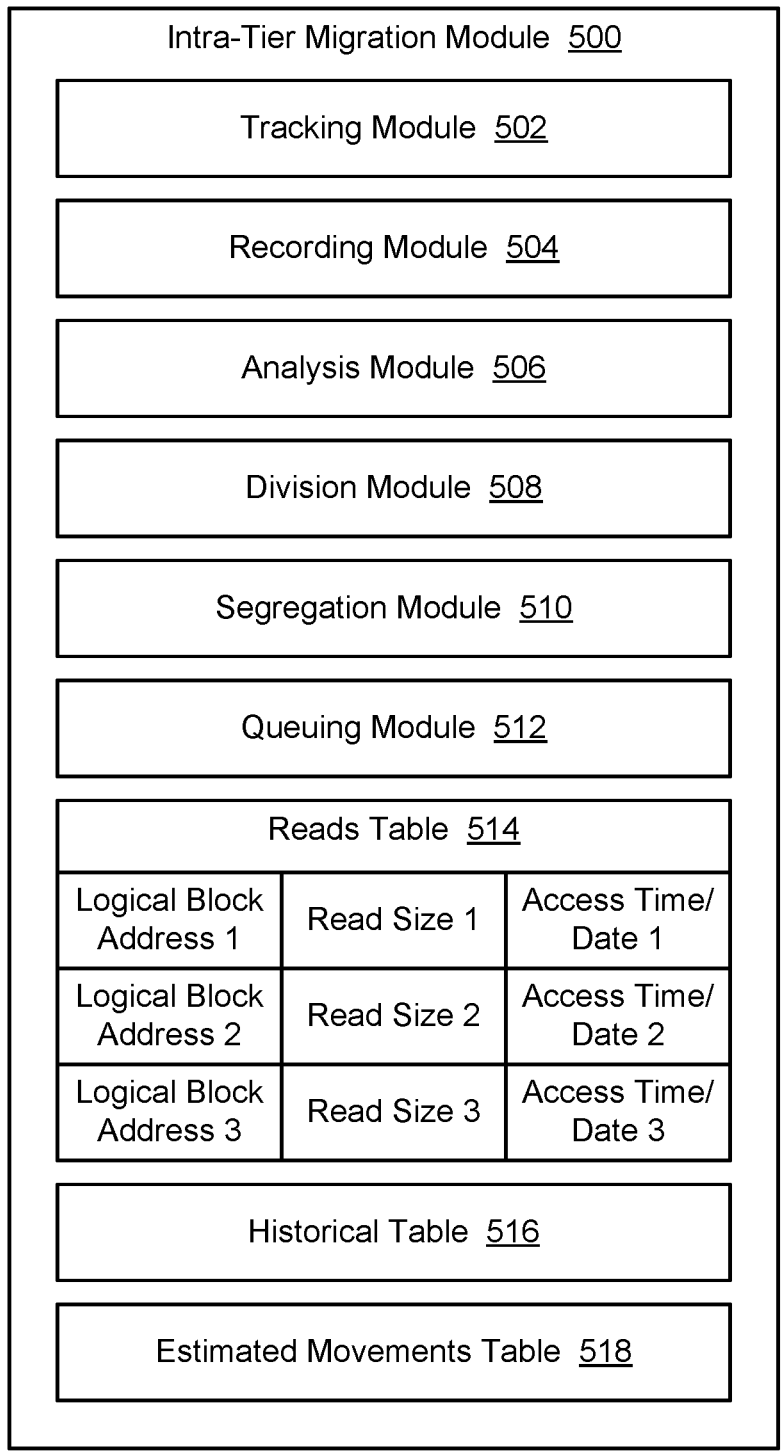
FIG. 5 is a high-level block diagram showing an intra-tier migration module for implementing various features and functions of the invention.

Referring to FIG. 5, in certain embodiments, an intra-tier migration module 500 may be provided to establish a dead storage pool 302b and zombie storage pool 302a and migrate data therebetween. As shown, the intra-tier migration module 500 includes various sub-modules to provide various features and functions. The sub-modules may include one or more of a tracking module 502, recording module 504, analysis module 506, division module 508, segregation module 510, queueing module 512. These sub-modules may utilize one or more of a reads table 514, historical table 516, and estimated movements table 518 to provide their various features and functions. The intra-tier migration module 500 and associated sub-modules may be implemented in software, firmware, hardware, or combinations thereof. The sub-modules are presented by way of example and are not intended to represent an exhaustive list of sub-modules that may be included in or associated with the intra-tier migration module 500. The intra-tier migration module 500 may include more or fewer sub-modules than those illustrated, or the functionality of the sub-modules may be organized differently.

As shown, the tracking module 502 may track reads to data in the storage tier 300c. The recording module 504 may record these reads and the data that is being read in the reads table 514. In certain embodiments, the reads table 514 may record a logical block address associated with the start of data that was read, and a size (e.g., number of logical blocks) of the read. Using these two pieces of information, the chunk of data that was read and its location may be determined. The recording module 504 may also record a time/date that the data was read in the reads table 514. In certain embodiments, each time that data is read from the storage tier 300c, the recording module 504 may create an entry in the reads table 514 that records the data that was read and the time/date that it was read. When the reads table 514 grows too large, it may overflow into the historical table 516, which may store the same data or entries as the reads table 514.

The analysis module 506 may analyze the reads in the reads table 514 to detect I/O patterns and determine which data is triggering the storage drives 204 to power up and become active. The analysis module 506 may also determine the frequency that certain data is causing the storage drives 204 in the storage tier 300c to become active. One example of a method that the analysis module 506 may use to analyze the reads table 514 will be discussed association with FIG. 6.

The division module 508 may logically divide the storage tier 300c into a zombie storage pool 302a, intended to store slightly active data, and a dead storage pool, intended to store inactive data. Each of these pools 302a, 302b may contain different storage drives 204 or groups of storage drives 204. The division module 508 may adjust the allocation as needed. For example, the zombie storage pool 302a may be expanded or contracted as needed to accommodate more or less "zombie" data, and the dead storage pool 302b may be expanded or contracted as needed to accommodate more or less "dead" data. "Dead" storage 302b may be converted to "zombie" storage 302a and vice versa as needs change.

Once the zombie storage pool 302a and dead storage pool 302b are established, the segregation module 510 may segregate data in the storage tier 300c into the two storage pools 302a, 302b. Specifically, "dead" data may be placed or retained in the dead storage pool 302b, and "zombie" data may be placed or retained in the zombie storage pool 302a.

In certain cases, data may be migrated between the dead storage pool 302b and zombie storage pool 302a in a way that prevents storage drives 204 from being powered up unnecessarily or too frequently. This will reduce power consumed by the dead storage pool 302b. For example, if data is identified to be moved to the dead storage pool 302b, instead of moving the data immediately, the queueing module 512 may queue this data for movement the next time the dead storage pool 302b is powered up. Similarly, if data is identified for movement from the dead storage pool 302b to the zombie storage pool 302a, the time/date the data will actually be needed (i.e., for reads and/or writes) may be estimated and the queueing module 512 may queue the data for movement at a particular time/date so that it is available in the zombie storage pool 302a when needed. This will enable data to be moved as a batch when the dead storage pool 302b is powered up and prevent the dead storage pool 302b from being powered up too frequently or unnecessarily. In certain embodiments, analytics may be run on the reads table 514 and/or historical table 516 to forecast when data will be read next, thereby allowing it to be migrated to the zombie storage pool 302a (or higher levels 300a, 300b in the tiered storage system) so that it will be available when needed, while keeping the dead storage pool 302b powered down as much as possible. The estimated movements table 518 may be used to forecast when data will be needed so that it can be moved at an appropriate time, as will be explained in more detail in association with FIG. 6.

Figure 6:
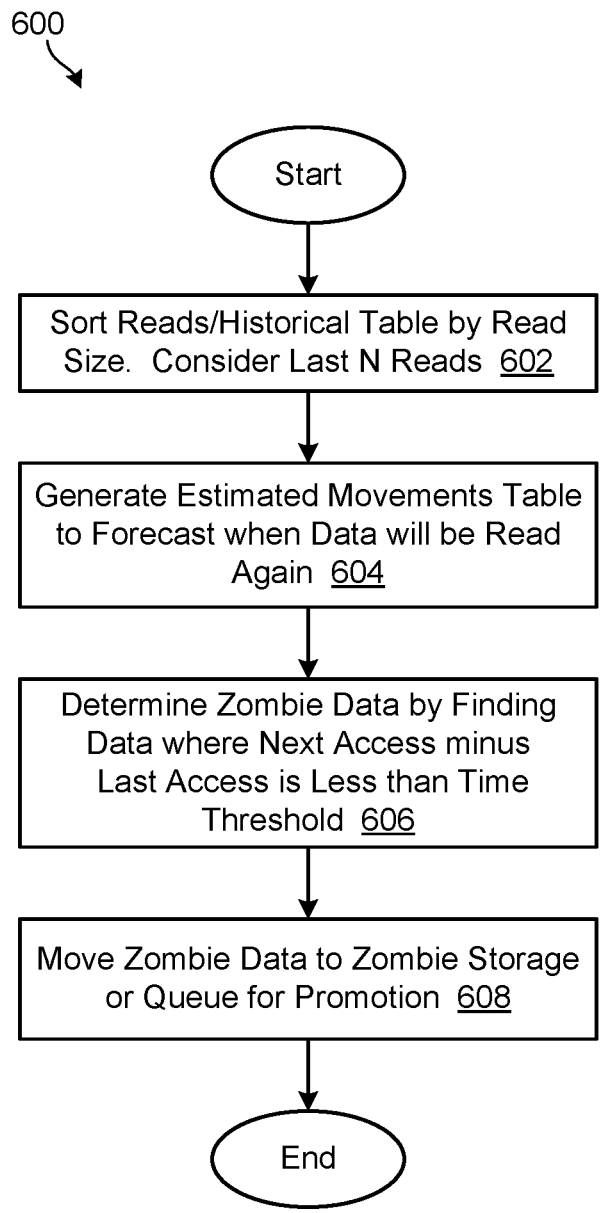
FIG. 6 is a process flow diagram showing a method for segregating data within dead and zombie storage.

Referring to FIG. 6, one embodiment of a method 600 for segregating data within the dead and zombie storage pools 302a, 302b using the reads table 514 and/or historical table 516 is illustrated. This method 600 is presented by way of example and is not intended to be limiting. As shown, the method 600 initially sorts 602 information in the reads table 514 and/or historical table 516 by read size. This may, in certain embodiments, be performed in a separate data structure. The method 600 may, in certain embodiments, only consider a certain number (N) of observations, such as the last five or ten reads of each piece of data. That is, the last (N) reads of the data may be taken into consideration for the remainder of the analysis 600.

The method 600 then generates 604 an estimated movements table 518 to forecast, based on information extracted from the reads table 514 and/or historical table 516, when the data will be needed (e.g., read from) again. The method 600 then determines 606 which data in the estimated movements table 518 should be considered "zombie" data and therefore moved to the zombie storage pool 302a. In particular, the method 600 determines 606, for each logical block address or logical block address range identified in the estimated movements table 518, whether the predicted time of the next access minus the last recorded access is smaller than a selected time threshold. If the predicted time of next access minus the last recorded access is smaller than the selected time threshold, the method 600 identifies the logical block address or logical block address range as "zombie" data and either moves 608 the "zombie" data to the zombie storage pool 302a immediately or queues 608 the "zombie" data for movement to the zombie storage pool 302a when the zombie storage pool 302a and/or dead storage pool 302b is powered up but before the estimated time the "zombie" data will be read again. In certain embodiments, the movement of data may be scheduled so that it will activate dead storage drives 204 on a fixed schedule to avoid activation and movement during peak times on active storage drives 204.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for segregating zombie storage from dead storage, the method comprising:
    tracking I/O to a storage tier intended to store inactive data, the storage tier comprising storage drives of similar cost and performance characteristics;
    analyzing the I/O to identify slightly active data in the storage tier;
    logically dividing the storage tier into a zombie storage pool, made up of storage drives intended to store slightly active data, and a dead storage pool, made up of storage drives intended to store inactive data; and
    segregating, within the storage tier, the slightly active data from the inactive data, wherein segregating comprises storing the slightly active data in the zombie storage pool and storing the inactive data in the dead storage pool.

2. The method of claim 1, wherein the dead storage pool is made up of storage drives that are normally powered down.

3. The method of claim 2, wherein the zombie storage pool is made up of storage drives that are powered up more frequently than storage drives of the dead storage pool.

4. The method of claim 3, wherein the storage drives of the zombie storage pool have similar performance characteristics as the storage drives of the dead storage pool.

5. The method of claim 1, wherein tracking the I/O comprises recording, in a table, data accessed by the I/O and a date/time the data was accessed.

6. The method of claim 1, wherein segregating the slightly active data comprises delaying migrating the slightly active data from the dead storage pool to the zombie storage pool until the next time storage drives in the dead storage pool are powered up.

7. The method of claim 1, wherein segregating the slightly active data comprises delaying migrating the slightly active data from the dead storage pool to the zombie storage pool until the slightly active data is needed.

8. A computer program product for segregating zombie storage from dead storage, the computer program product comprising a computer-readable storage medium having computer-usable program code embodied therein, the computer-usable program code configured to perform the following when executed by at least one processor:
    track I/O to a storage tier intended to store inactive data, the storage tier comprising storage drives of similar cost and performance characteristics;
    analyze the I/O to identify slightly active data in the storage tier;
    logically divide the storage tier into a zombie storage pool, made up of storage drives intended to store slightly active data, and a dead storage pool, made up of storage drives intended to store inactive data; and
    segregate, within the storage tier, the slightly active data from the inactive data, wherein segregating comprises storing the slightly active data in the zombie storage pool and storing the inactive data in the dead storage pool.

9. The computer program product of claim 8, wherein the dead storage pool is made up of storage drives that are normally powered down.

10. The computer program product of claim 9, wherein the zombie storage pool is made up of storage drives that are powered up more frequently than storage drives of the dead storage pool.

11. The computer program product of claim 10, wherein the storage drives of the zombie storage pool have similar performance characteristics as the storage drives of the dead storage pool.

12. The computer program product of claim 8, wherein tracking the I/O comprises recording, in a table, data accessed by the I/O and a date/time the data was accessed.

13. The computer program product of claim 8, wherein segregating the slightly active data comprises delaying migrating the slightly active data from the dead storage pool to the zombie storage pool until the next time storage drives in the dead storage pool are powered up.

14. The computer program product of claim 8, wherein segregating the slightly active data comprises delaying migrating the slightly active data from the dead storage pool to the zombie storage pool until the slightly active data is needed.

15. A system for segregating zombie storage from dead storage, the system comprising:
    at least one processor;
    at least one memory device operably coupled to the at least one processor and storing instructions for execution on the at least one processor, the instructions causing the at least one processor to:
    track I/O to a storage tier intended to store inactive data, the storage tier comprising storage drives of similar cost and performance characteristics;
    analyze the I/O to identify slightly active data in the storage tier;
    logically divide the storage tier into a zombie storage pool, made up of storage drives intended to store slightly active data, and a dead storage pool, made up of storage drives intended to store inactive data; and
    segregate, within the storage tier, the slightly active data from the inactive data, wherein segregating comprises storing the slightly active data in the zombie storage pool and storing the inactive data in the dead storage pool.

16. The system of claim 15, wherein the dead storage pool is made up of storage drives that are normally powered down.

17. The system of claim 16, wherein the zombie storage pool is made up of storage drives that are powered up more frequently than storage drives of the dead storage pool.

18. The system of claim 17, wherein the storage drives of the zombie storage pool have similar performance characteristics as the storage drives of the dead storage pool.

19. The system of claim 15, wherein tracking the I/O comprises recording, in a table, data accessed by the I/O and a date/time the data was accessed.

20. The system of claim 15, wherein segregating the slightly active data comprises delaying migrating the slightly active data from the dead storage pool to the zombie storage pool until the next time storage drives in the dead storage pool are powered up.

* * * * *